(12) United States Patent
Götz et al.

(10) Patent No.: US 12,544,753 B2
(45) Date of Patent: Feb. 10, 2026

(54) COMPONENT WITH MICROFLUIDIC STRUCTURES, METHOD FOR THE PRODUCTION AND USE THEREOF

(71) Applicant: Joanneum Research Forschungsgesellschaft mbH, Graz (AT)

(72) Inventors: Johannes Götz, Gleisdorf (AT); Barbara Stadlober, Graz (AT); Stephan Ruttloff, Anger (AT); Dieter Nees, Thannhausen (AT)

(73) Assignee: JOANNEUM RESEARCH FORSCHUNGSGESELLSCHAFT MBH, Graz (AT)

( * ) Notice: Subject to any disclaimer, the term of this patent is extended or adjusted under 35 U.S.C. 154(b) by 726 days.

(21) Appl. No.: 17/926,173

(22) PCT Filed: Apr. 13, 2021

(86) PCT No.: PCT/EP2021/059501
§ 371 (c)(1),
(2) Date: Nov. 18, 2022

(87) PCT Pub. No.: WO2021/244796
PCT Pub. Date: Dec. 9, 2021

(65) Prior Publication Data
US 2023/0191396 A1 Jun. 22, 2023

(30) Foreign Application Priority Data
Jun. 2, 2020 (DE) .................. 102020114621.3

(51) Int. Cl.
*B01L 3/00* (2006.01)
(52) U.S. Cl.
CPC ..... *B01L 3/502707* (2013.01); *B01L 2300/16* (2013.01)
(58) Field of Classification Search
CPC .......... B01L 2300/16; B01L 3/502707; B81B 2201/051; B81C 1/00119; B81C 2203/038
See application file for complete search history.

(56) References Cited

U.S. PATENT DOCUMENTS

| | | |
|---|---|---|
| 6,375,871 B1 | 4/2002 | Bentsen et al. |
| 6,761,962 B2 | 7/2004 | Bentsen et al. |
| 2002/0098124 A1 | 7/2002 | Bentsen et al. |
| 2009/0281250 A1 | 11/2009 | DeSimone et al. |
| 2015/0184127 A1 | 7/2015 | White et al. |
| 2019/0185629 A1* | 6/2019 | Pan .......................... C09J 5/00 |

FOREIGN PATENT DOCUMENTS

| | | |
|---|---|---|
| WO | 2010059351 A2 | 5/2010 |
| WO | 2018027009 A1 | 2/2018 |

\* cited by examiner

*Primary Examiner* — Jennifer Wecker
(74) *Attorney, Agent, or Firm* — Duane Morris LLP

(57) ABSTRACT

A method of manufacturing a component having a microfluidic structure, comprising embossing recesses in an embossed lacquer layer, partially curing the embossed lacquer layer, sealing the recesses with a curable bonding lacquer layer, and curing the partially cured embossing lacquer layer and the bonding lacquer layer, as well as a component obtainable by the method and the use of the component.

13 Claims, No Drawings

COMPONENT WITH MICROFLUIDIC STRUCTURES, METHOD FOR THE PRODUCTION AND USE THEREOF

FIELD OF THE INVENTION

The present invention relates to a method of manufacturing a component having microfluidic structures, a component producible by the method, and uses of the component.

STATE OF THE ART

Components with microfluidic structures are typical elements in many sensor chips and contain microchannels and microchambers in which liquids can be absorbed, transferred, mixed or otherwise processed. Exemplary applications are biosensors for the fast diagnosis of germs in hospitals or for the fast analysis of chemicals in process technology, environmental analysis and the like. For most applications, the microfluidic structures are closed with a cover containing inlet and outlet ports.

Microfluidic structures are usually manufactured by an injection molding process, whereby a thermoplastic material is pressed into a mold in a hot state. The resulting structures can then be bonded to a cover layer, which is also thermoplastic, or to a further thermoplastic microfluidic layer using known processes. The disadvantages of the injection molding process are the high time required for injection and cooling processes, as well as the low throughput of the subsequent process steps, since the microfluidic chips must be further processed as individual pieces in the process.

An alternative way of producing microfluidic structures is a high-throughput production process in which the channels are produced on large polymer substrates in roll format. Using a roll-to-roll process, very large areas can be embossed in a short time.

PROBLEMS TO BE SOLVED BY THE INVENTION

However, no process is known in the prior art with which the channels can be tightly sealed with a cover layer in an efficient and simple manner in a process step after embossing.

Therefore, it is the object of the present invention to provide a simplified and efficient process that enables a strong bond between channel surfaces and their covers by UV crosslinking in a roll-to-roll process.

SUMMARY OF THE INVENTION

The problem was solved by providing the method, the component as well as the use according to the present invention and as defined in the patent claims.

More particularly, the subject matter of the present invention is defined in the following points [1] to [15] and [2-1] to [13-4]:

[1] A method of manufacturing a component having a microfluidic structure, comprising the steps of:
(a) applying a layer of a curable embossing lacquer to a bottom film,
(b) embossing recesses in the embossing lacquer layer obtained in step (a) using an embossing tool,
(c) partially curing the embossed lacquer layer embossed in step (b) to form a partially cured structured layer,
(d) removing the embossing tool to form a bottom member comprising the bottom film and the partially cured structured layer,
(e) applying a layer of a curable bonding lacquer to a cover film to form a cover member, the thickness of the bonding lacquer layer of the cover member being less than the embossing depth of the partially cured structured layer of the bottom member formed in step (d),
(f) forming a composite of the bottom member obtained in step (d) and the cover member obtained in step (e), wherein the partially cured structured layer of the bottom member is placed on the bonding lacquer layer of the cover member so that the recesses of the partially cured structured layer of the bottom member are sealed by the bonding lacquer layer of the cover member to form cavities which form a microfluidic structure,
(g) curing the partially cured structured layer and the bonding lacquer layer of the composite obtained in step (f) to form covalent bonds between these layers, thereby obtaining the component having a microfluidic structure.

[2] The method according to [1], wherein the curing in step (g) is carried out via the polymerization systems contained in the partially cured structured layer and the bonding lacquer layer, each containing polymerizable compounds having carbon-carbon double bonds.

That is, C—C double bonds are involved in the polymerization to form covalent bonds between the layers. Polymerization systems can be used that are based exclusively on compounds with C—C double bonds or are thiol-ene systems.

[2-1] Preferably, the curing in step (g) according to item [1] or [2] is executable by UV irradiation. That is, the polymerization systems of the curable embossing lacquer and the curable bonding lacquer are UV curable across layers.

The polymerizable compounds having carbon-carbon double bonds are preferably (meth)acrylate-containing compounds.

[3] The method according to [1] or [2] or [2-1], wherein the curable embossing lacquer and the curable bonding lacquer independently of each other comprise at least 50 mass % of a polymerization system selected from polymerizable compounds having carbon-carbon double bonds and thiol-ene systems.

Here, "independently of each other" means that the curable embossing lacquer and the curable bonding lacquer may differ from each other with respect to the weight fraction of the polymerization systems. The structure of the compounds of the respective polymerization systems may also be different as long as covalent bonds are formed between them during curing and thus between the two layers.

Preferably, in the curable embossing lacquer and the curable bonding lacquer, the reactive groups are the same, for example vinyl groups in each case. Even more preferably, not only the reactive groups but the polymerizable compounds as a whole, i.e. the monomers or the oligomers, are the same.

[3-1] A combination of the features of [2] and [3] is preferred. [3-2] A combination of the features of [2], [2-1] and [3] is more preferred.

[4] The method according to any one of the preceding points, wherein the curable embossing lacquer and the curable bonding lacquer are at least 80 mass %, preferably at least 90 mass %, of the same composition.

Not more than 20 mass %, preferably not more than 10 mass % of the curable embossing lacquer and the curable bonding lacquer may be different compounds, for example different initiators or reactive diluents.

The compositions may be the same not only with respect to the polymerizable compounds. It may also be preferred that the curable embossing lacquer and the curable bonding lacquer contain surface-active anti-adhesive additives which are the same in structure and amount.

[4-1] A combination of the features of [2] and [4] is preferred. [4-2] A combination of the features of [2], [2-1] and [4] is more preferred.

[5] The method of any one of the preceding points, wherein the curable bonding lacquer is not partially cured prior to step (g).

[6] A method according to any one of the preceding points, wherein the cover member is arranged such that the curable bonding lacquer rests on the cover film by the action of gravity, or wherein the layer of curable bonding lacquer is selected to adhere to the cover member without covalent bonding.

[7] The method according to any one of the preceding points, wherein the partial curing in step (c) and the curing in step (g) are carried out by means of UV irradiation.

Preferably, the partial curing, if any, of the bonding lacquer layer after step (e) is also carried out via UV curing. This means that the polymerization system is then UV-curable both within the curable embossing lacquer and within the curable bonding lacquer as well as across the layers.

[8] The method of any one of the preceding points, wherein the bottom film and the cover film are each a polymeric film.

[8-1] The same polymeric film as bottom film and cover film is preferred.

[9] The method of any one of the preceding points, wherein, after step (g), the cured structured layer and the cured bonding lacquer layer have the same thickness or a thickness that differs by no more than 20% in the region of the cavities.

[9-1] The same thickness is preferred. [9-2] A combination of the features of [9] with the feature that the bottom film and the cover film have the same thickness or a thickness that differs by at most 20% is preferred. [9-3] A combination of the features of [8-1] and [9-1] is more preferred.

[10] The method according to any one of the preceding points, which is carried out in a continuous manner.

[10-1] In the process according to [10], a roll-to-roll process is preferably used for embossing in step (b).

[11] The method according to [1], which is carried out in a continuous manner, wherein the bottom film and the cover film are each a polymer film, the curable embossing lacquer and the curable bonding lacquer are at least 80 mass % of the same composition, the curable bonding lacquer is not partially cured before step (g), the partial curing in step (c) and the curing in step (g) are carried out by UV irradiation, and the thickness of the bonding lacquer layer of the cover member is less than 20% of the depth of the recesses of the partially cured structured layer of the bottom member.

[12] The method according to [1] or [11], wherein the curable embossing lacquer and the curable bonding lacquer each contain at least 50 mass % of polymerizable compounds having carbon-carbon double bonds, the curing in step (g) is carried out via polymerizable compounds having carbon-carbon double bonds in the partially cured structured layer and the bonding lacquer layer, and the curable embossing lacquer and the curable bonding lacquer are at least 80 mass % of the same composition.

[13] A component having a microfluidic structure obtainable by a method according to any one of [1] to [12].

[13-1] Preferably, the bonding lacquer layer in the component according to [13] is not embossed. [13-2] Preferably, the bonding lacquer layer in the component according to [13] or [13-1] has a thickness of less than 1 μm. [13-3] Preferably, the bonding lacquer layer in the component according to [13] or [13-1] has a thickness of less than 1 μm and the structured layer has a thickness of at least 5 μm, preferably at least 10 μm. [13-4] In a preferred embodiment of [13] to [13-3], the composition of the structured layer differs from the composition of the bonding lacquer layer and the bonding lacquer layer is partially located in the recesses of the structured layer.

This difference may, for example, be due solely to the fact that the structured layer and the bonding lacquer layer differ in the content of surface-active anti-adhesive additive, the bonding lacquer layer, for example, not containing any surface-active anti-adhesive additive. Likewise, the difference may be due solely to the fact that, while the content of surface-active anti-adhesive additives is the same, the surface-active anti-adhesive additives are arranged on the surface of the unembossed bonding lacquer layer differently than on the surface of the structured layer as a result of the embossing, which leads to different surface properties.

[14] A component having a microfluidic structure according to any one of [13] to [13-4], wherein the polymer of the structured layer and the polymer of the bonding lacquer layer are at least 80 mass % identical. More preferably, the polymers are 100 mass % identical. In other words, the polymers are based on identical monomer units to at least 80 or 100 mass %, which in the case of copolymers may of course be randomly arranged. Preferably, the polymers each account for at least 80 mass % of the total layer. In a particular embodiment, the structured layer and the bonding lacquer layer can be completely identical, i.e. not only with respect to the polymers, but also with respect to any additives present.

[15] Use of the device having a microfluidic structure according to any one of [13] to [14] as a biosensor, in the diagnosis of germs, in environmental analysis or in the analysis of chemicals in process engineering.

Furthermore, the present invention relates to the following aspects [1] to [14] and [4-1] to [12-6]:

[1] A method of manufacturing a component having a microfluidic structure, comprising the steps of:
(a) applying a layer of a curable embossing lacquer to a bottom film,
(b) embossing recesses in the embossing lacquer layer obtained in step (a) using an embossing tool,
(c) partially curing the embossed lacquer layer embossed in step (b) to form a partially cured structured layer,
(d) removing the embossing tool to form a bottom member comprising the bottom film and the partially cured structured layer,
(e) applying a layer of a curable bonding lacquer to a cover film to form a cover member, the thickness of the bonding lacquer layer of the cover member being less than the embossing depth of the partially cured structured layer of the bottom member formed in step (d), (f) forming a composite of the bottom member obtained in step (d) and the cover member obtained in step (e), wherein the partially cured structured layer of the bottom member is placed on the bonding lacquer layer of the cover member so that the recesses of the partially cured structured layer of the bottom member are sealed by the bonding lacquer layer of the cover member to form cavities which form a microfluidic structure, (g) curing the partially cured structured layer and the bonding lacquer layer of the composite obtained in step (f) with the formation of covalent bonds between these layers, whereby the component with a microfluidic structure is obtained.

[2] The method according to [1], wherein the curable embossing lacquer and the curable bonding lacquer have the same composition.

[3] The method according to any one of the preceding aspects, wherein the curable bonding lacquer is not partially cured before step (g).

[4] The method according to any one of the preceding aspects, wherein the cover member is arranged such that the curable bonding lacquer rests on the cover film by the action of gravity, or wherein the layer of curable bonding lacquer is selected, in particular thin, to adhere to the cover member without covalent bonding.

[4-1] A combination of the features of [3] and [4] is preferred, and it is more preferred that the layer of curable bonding lacquer is thin enough to adhere to the cover member without covalent bonding.

[5] The method according to any one of the preceding aspects, wherein the partial curing in step (c) and the curing in step (g) are performed by UV irradiation.

[5-1] Preferably, a process according to [5] is used in which the embossing lacquer and the bonding lacquer comprise (meth)acrylate groups or thiol-ene systems polymerizable by means of UV irradiation.

[6] The method according to any one of the preceding aspects, wherein the bottom film and the cover film are each a polymeric film.

[6-1] The same polymeric film as bottom film and cover film is preferred.

[7] The method according to any one of the preceding aspects, wherein the thickness of the bonding lacquer layer of the cover member is less than 20% of the depth of the recesses of the partially cured structured layer of the bottom member.

Preferably [7-1] the thickness of the bonding lacquer layer of the cover member is less than 10%, more preferably [7-2] is less than 5% of the depth of the recesses of the partially cured structured layer of the bottom member. For example, the bonding lacquer layer has a thickness of less than 1 μm.

[8] The method according to any one of the preceding aspects, wherein the bottom film and the cover film have the same thickness or a thickness that differs by no more than 20%.

[8-1] The same thickness is preferred.

[9] The method according to any one of the preceding aspects, wherein after step (g) the cured structured layer and the cured bonding lacquer layer have the same thickness or a thickness differing by at most 20% in the region of the cavities.

[9-1] The same thickness is preferred. [9-2] A combination of the features of [8] and [9] is preferred. [9-3] A combination of the features of [8-1] and [9-1] is more preferred.

[10] The method according to any one of the preceding aspects, which is carried out in a continuous manner.

[10-1] In the process according to [10], a roll-to-roll process is preferably used for embossing in step (b).

[11] The method according to [1], which is carried out in a continuous manner, wherein the curable embossing lacquer and the curable bonding lacquer have the same composition, the curable bonding lacquer is not partially cured before step (g), either the cover member is arranged in such a way that the curable bonding lacquer rests on the cover film by gravity, or the layer of curable bonding lacquer is selected, in particular is thin enough, to adhere to the cover member without covalent bonding, the partial curing in step (c) and the curing in step (g) are carried out by means of UV irradiation, and the thickness of the bonding lacquer layer of the cover member is less than 20% of the depth of the recesses of the partially cured structured layer of the bottom member.

[11-1] A limitation of the features of [11] to [7-1] is preferred. [11-2] A restriction of the features of [11-1] to [5-1] is preferred.

[12] The method according to [1] or [11], wherein the bottom film and the cover film have the same thickness or a thickness differing by at most 20%, and wherein, after step (g), the cured structured layer and the cured bonding lacquer layer have the same thickness or a thickness differing by at most 20% in the region of the cavities.

[12-1] A limitation of the features of [12] to [9-3] is preferred. Particularly preferred are: [12-2] combinations of the features of [12] and [11-1]; [12-3] combinations of the features of [12] and [11-2]; [12-4] combinations of the features of [12-1] and [11]; [12-5] combinations of the features of [12-1] and [11-1]; [12-6] combinations of the features of [12-1] and [11-2].

[13] A component having a microfluidic structure obtainable by a method according to any one of the preceding aspects [1] to [12] and [4-1] to [12-6].

[14] The use of the component having a microfluidic structure according to [13] as a biosensor, in the diagnosis of germs, in environmental analysis or in the analysis of chemicals in process engineering.

Advantages of the Invention

The microfluidic structures of the components according to the invention are tightly and hermetically sealed all around due to the covalent bond between the cover and the side walls. This makes the microfluidic structures mechanically stable and insensitive to pressure differences and stresses during handling. At the same time, the structure of carrier films and thin layers of lacquer results in a high degree of mechanical flexibility, which enables production in cost-effective roll processes. The microfluidic structures are also sealed without the use of an adhesive, thus avoiding possible contamination.

Since the microfluidic structures can be made of the same material all around, a uniform and trouble-free transport of the fluids or the analyte is possible.

By suitable selection of the thicknesses of the substrate films, the embossing depth and the thickness of the bonding lacquer layer, an improvement in the mechanical stability can be achieved if the neutral mechanical plane is shifted or placed exactly in the interface between the bonding lacquer layer and the structured layer. This reduces mechanical stresses during stretching, compression or bending.

The process according to the invention enables simple UV bonding and can thus be used in high-throughput processes. Compared to injection moulding processes, significant cost reductions are therefore possible.

In contrast to thermal bonding, UV bonding creates a covalent bond. Since UV bonding does not require thermoplastic behavior, there is no restriction here to monofunctional acrylates, so that there is more freedom in material development.

Due to the formation of cross-links during hardening, the channel materials are elastic, so that cracking is avoided during roll-based production or in the application.

EMBODIMENTS OF THE INVENTION

The device according to the invention includes at least one microfluidic structure sandwiched between two substrate films. The microfluidic structure has dimensions in the micrometer scale in the z-direction and either in the x-direction or the y-direction, the x-y plane being defined by the faces of the substrate films. For example, the microfluidic structure has a depth (in the z-direction) and width (x- or y-direction) of 0.1 to 200 μm each, preferably 1 to 50 μm. The microfluidic structure is suitable for receiving and transporting fluids, i.e. gases or liquids.

When the singular is used in the present invention to refer to elements or structures, for example, "a microfluidic structure" or "the microfluidic structure", it is not intended to expressly exclude a plurality of such elements or structures, so that the exemplary terms are synonymous with "at least one microfluidic structure" or "the at least one microfluidic structure", unless otherwise indicated.

The microfluidic structure is tightly sealed all around. The term "all around" in reference to the cover means here that a microfluidic structure is sealed at any point in the z-direction, that is, in the direction perpendicular to the substrate film plane, and in the x-direction or y-direction. Thus, at each point of a microfluidic structure, there is a cross-sectional plane in the y-direction in which the microfluidic structure is sealed all around. The microfluidic structures have at least one opening, preferably at least one inlet opening and at least one outlet opening, at one of their ends in the x-y plane. The term "tight" means here that the cover of a microfluidic structure cannot be detached non-destructively, for example by heating. The basis for the tight covering in the present invention is the covalent bond between the initial structures.

The tight closure of the microfluidic structures is achieved by the fact that the surfaces of the elements are chemically bonded to each other, i.e. covalently bonded. This creates a layered structure with an embedded microfluidic structure that can no longer be separated into its individual parts.

A hermetic seal also prevents the ingress of foreign substances and impurities that could falsify the analysis result, and also allows carrying out temperature-controlled processes (e.g. on-chip PCR).

The microfluidic structures are sealed exclusively with hardened embossing lacquer and hardened bonding lacquer. This means that the bottom, the side walls and the cover consist exclusively of these hardened lacquers. This embodiment excludes other substances, for example an adhesive between the bottom member and the cover member.

The Curable Embossing Lacquer and the Curable Bonding Lacquer

The curable embossing lacquer and the curable bonding lacquer may be the same or different. The term "lacquer" as used in the present application refers both to the curable embossing lacquer and independently to the curable bonding lacquer, unless otherwise indicated.

The lacquer is curable, for example thermally or by using UV rays or electron beams. Curing with UV rays is preferred. Preferably, the lacquer comprises at least one compound having polymerizable C—C double bonds. The compound may be selected from the group consisting of acrylates, methacrylates, vinyl ethers, allyl ethers, propenyl ethers, alkenes, dienes, unsaturated esters, allyl triazines, allyl isocyanates and N-vinyl amides. (Meth)acrylates are preferred. Acrylate-containing compounds may be selected from the group consisting of urethane acrylates, vinyl acrylates, epoxy acrylates, polyester acrylates, polyacrylates, polyether acrylates and polyolefin acrylates. Urethane acrylates are preferred. In addition to the compound having polymerizable C—C double bonds, the coating may also contain thiol-containing compounds.

Suitable UV-crosslinkable coatings are based, for example, on polyethylene glycol diacrylates (PEGDA), optionally with 1-10 mass % of higher functional acrylates, such as trimethylolpropane triacrylate (TMPTA) or pentaerythritol tetraacrylate (PETTA) or mixtures of acryloyl morpholine (ACMO) with 10-50 mass % of higher functional acrylates, such as trimethylolpropane triacrylate (TMPTA) or pentaerythritol tetraacrylate (PETTA), or coating systems based on highly crosslinking multifunctional polyether, polyester or polyurethane acrylate systems, for example polyether polyol triacrylates, multi-ethoxylated trimethylol propane triacrylates or multi-ethoxylated bisphenol A diacrylates.

Polyethylene glycol diacrylates, trimethylolpropane triacrylate, acryloyl morpholine, pentaerythritol tetraacrylate, hexanediol diacrylate and trifunctional urethane acrylate oligomer are preferred.

In the present invention, a compound component designated by the term "acrylic" always includes the derivative "methacrylic" unless otherwise indicated. For example, the residue "acrylate" is thus intended to cover also the residue "methacrylate".

In the present invention, UV-curable acrylic coatings are particularly preferred. They are good to process in a roll-to-roll process, as they do not require any pre-processes (prebake such as SU8) and crosslink very quickly (in less than 1 s). They are also very adjustable with regard to their surface energy and thus their wetting properties, which play an essential role in capillary-driven microfluidics.

The lacquer may contain 0.05 to 5 mass % of photoinitiators which effect crosslinking under UV radiation, for example photoinitiators based on acyl phosphine oxides, or oligomeric polyfunctional alpha hydroxy ketones or monomeric alpha hydroxy ketones.

Particularly suitable photoinitiators are, for example, photoinitiators based on acyl phosphine oxides, such as Irgacure 819®, Genocure TPO®, Genocure BAPO® or oligomeric polyfunctional alpha hydroxy ketones such as Esacure KIP 150®, monomeric alpha hydroxy ketones such as Irgacure 184 or Darocure 1173®. However, mixtures of these photoinitiators can also be used.

Bottom Film and Cover Film

The bottom film and the cover film are substrate films, i.e. carrier films, for the embossing lacquer and the bonding lacquer, respectively. They may be selected independently of each other and may be the same or different. Preferably, both substrate films are flexible.

The substrate film preferably has a thickness of 5 to 2000 µm, preferably 10 to 1000 µm, particularly preferably 20 to 500 µm. It is preferably a plastic film made of PI, PP, MOPP, PE, PPS, PEEK, PEK, PEI, PSU, PAEK, LCP, PEN, PBT, PET, PA, PC, COC, POM, ABS, PVC, PTFE, ETFE (ethylene tetrafluoroethylene), PTFE (polytetrafluoroethylene), PVF (polyvinyl fluoride), PVDF (polyvinylidene fluoride), and EFEP (ethylene-tetrafluoroethylene-hexafluoropropylene-fluoropolymer).

Additive

The embossing lacquer and the bonding lacquer may independently contain additives. Examples of such additives are surface-active anti-adhesion additives and reactive thinners.

(i) Surface Active Anti-Adhesive Additive

To reduce adhesion of the embossing lacquer to the embossing tool and to facilitate removal of the embossing tool after embossing, a surface-active anti-adhesion additive may be added to the embossing lacquer used as the starting material, which may be silicone-containing or fluorine-containing. In particular, the additive is at least one member selected from the group comprising silicone-containing or fluorine-containing additives. Specific examples include non-ionic surfactants such as polyether siloxanes, fatty alcohol ethoxylates such as polyoxyethylene (9) lauryl ether, monofunctional polydimethylsiloxane (meth)acrylates, perfluoro n-alkyl (meth)acrylates, and perfluoropolyether (meth)acrylates. Silicone-containing or fluorine-containing additives help to reduce adhesion and facilitate release of the embossing lacquer from the embossing tool, with the perfluorinated additives in particular having been found to be particularly beneficial and to reliably allow a plurality of impressions of a pattern. The at least one additive may be present in the starting lacquer in an amount of from 0.1% to 3% by weight.

Said anti-adhesion additives may be at least partially present in the embossed structured layer after carrying out the process according to the invention, for example in an amount of 0.1 to 3% by weight.

Adhesion of the embossing lacquer to the embossing tool can also be prevented by modifying the surface of the embossing tool, in particular of the embossing stamp, with respect to its hydrophobicity.

(ii) Reactive Diluents

A reactive diluent may be included in the embossing lacquer and/or the bonding lacquer. A reactive diluent contains low molecular weight compounds to adjust the viscosity of the lacquer. Preferred reactive diluents are aliphatic (meth)acrylates or polyether (meth)acrylates, in particular HDDA or TMP(EO)xTA, for example TMP(EO)9TA, TMP(EO)6TA, TMP(EO)3TA or TMPTA.

The Embossing Lacquer Layer and the Bonding Lacquer Layer

The term "lacquer layer" as used in the present invention refers to both the layer of a curable embossing lacquer and the layer of a curable bonding lacquer. The lacquer layer comprises or consists of a lacquer.

The resist film is two-dimensional with dimensions in the x- and y-direction, which defines the contact plane with the substrate film, and in the z-direction, which indicates the thickness of the film. The term "thickness" of a layer here therefore always means the dimension perpendicular to the plane of the layer.

The lacquer layer material is applied to a substrate film. Due to the fact that the lacquer layer material is not cured, i.e. not polymerized, it has a low viscosity, so that it can be applied, for example, by brushing or by casting. Preferably, it is applied by engraving printing or slot die coating.

The viscosity is adjusted so that the material can be applied easily. On the other hand, it must be viscous enough to preserve the structure formed during embossing. In order to meet both requirements, the material applied to the substrate can first be moderately irradiated, so that partial curing and thus an increase in viscosity takes place. The coating may already be solid after partial curing, but it will have non-reacted reactive groups. Preferably, the lacquer layer material exhibits the desired low viscosity at room temperature. Thus, the application of the lacquer layer material can be carried out at low temperatures, such as room temperature.

The embossed lacquer layer has a thickness, that is an extent perpendicular to the contact surface with the substrate film, of preferably 100 nm to 1000 µm, more preferably 1 µm to 100 µm. In individual embodiments, the thickness may be 1 µm to 50 µm.

In any case, the bonding lacquer layer is thinner than the embossing lacquer layer and preferably has a thickness of less than 5 µm, more preferably less than 1 µm.

A preferred combination is an embossed lacquer layer having a thickness of 1 µm to 100 µm and a bonding lacquer layer having a thickness of less than 1 µm.

Preferably, the bonding lacquer layer is not embossed. That is, the bonding lacquer layer has not been embossed before forming the composite of the base part and the cover member. When the composite is formed, the bonding lacquer which has not been cured or has only been partially cured may be partially pressed into the recesses in the structured layer of the base part. The thus resulting structural change of the bonding lacquer is not to be understood as embossing in the sense of the invention.

The Manufacturing Method

Step (a):

The application of a layer of a curable embossing lacquer to a substrate film is carried out, for example, by a roll-to-roll process in which the application of the lacquer layer to the substrate film is carried out, for example, by means of a slit nozzle or by gravure printing with an engraving roller.

Step (b):

Embossing recesses in the embossing lacquer layer obtained in step (a) with an embossing tool is performed in at least a portion of the embossing lacquer layer and comprises forming a recess in the plane of the embossing lacquer layer.

Embossing is carried out with an embossing tool, e.g. a stamp, and can be implemented in a continuous roll-to-roll process if a cylindrical stamp is used.

Ultraviolet nanoimprint lithography (UV-NIL for short) can be used, in which a nanostructured stamp with the inverted profile of the desired structure is used as a negative mold and pressed into the embossing lacquer, in which the desired structure is then embossed as a positive mold. A preferred process according to the invention is a high throughput production process (roll-to-roll UV-NIL) for microfluidic structures, in which the channels and chambers are produced on large polymer substrates in roll format.

The depth of the embossing, i.e. the extent of the recess in the z-direction, can be 1 to less than 100% of the thickness of the embossing lacquer layer. Preferably it is 50 to less than 100%, more preferably 80 to less than 100% of the thickness of the embossing lacquer layer.

Step (c):

The extent of partial curing of the embossed lacquer layer embossed in step (b) is adjusted so that, on the one hand, a sufficient amount of reactive groups remains for subsequent curing and bonding with the bonding lacquer and, on the other hand, sufficient partial curing occurs to ensure the required stability of the structures for demolding and winding. For this purpose, the following parameters are optimized: Polymerization speed of the embossing lacquer (in particular the type and content of the photoinitiator), UV intensity, web speed, transmission of the substrate film.

Step (d):

After embossing and partial curing, the embossing tool is removed. To facilitate this step and to increase the quality of the embossing, surface-active anti-adhesive additives can be added to the embossing lacquer used in step (a).

Step (e):

The application of a preferably very thin layer of bonding lacquer to a cover film is preferably done by roll-to-roll engraving. The thickness of the masking layer should be as thin as possible to allow faster curing in step (g) and to prevent blocking of the recesses when forming the bond in step (f). If the masking layer is too thick, in step (f) the still liquid material may flow or be pressed into the recesses of the structured layer even before the surfaces and layers are chemically cured, i.e. covalently bonded. For example, the bonding lacquer layer has a thickness of less than 1 µm. A thickness of the bonding lacquer layer in the nanometer range also increases the flexibility of the component.

Since the embossing lacquer for application in step (a) has preferably low viscosity, and in a preferred embodiment the composition of the embossing lacquer and the bonding lacquer is the same, also the bonding lacquer has low viscosity when applied in step (e). In this case, it may be preferred or necessary that the cover member is arranged such that the bonding lacquer layer lies on the cover film under the effect of gravity, since otherwise it is not possible to ensure that the thin liquid bonding lacquer layer remains on the cover film until the laminating step (f). In a preferred embodiment, however, the adhesion of the bonding lacquer to the cover film occurs independently of the effect of gravity and is based on a non-covalent adhesion. This adhesion is achieved by adjusting the surface energies of the cover film and the bonding lacquer, by selecting a suitable bonding lacquer material and/or, in particular, by using a thin layer of the bonding lacquer.

In order to make the bonding lacquer layer more viscous and, if necessary, to bind it covalently to the cover film, it can be partially cured. However, this leads to a lower adhesion after curing in step (g).

Step (f):

The composite can be formed by laminating, welding or bonding.

With the exception of the recesses in the embossing, the embossed side of the structured layer is completely and directly covered by the bonding lacquer layer of the cover member. Preferably, therefore, neither embossing lacquer nor bonding lacquer is present in the recesses of the embossing, so that cavities are formed. The bottom film, the structured layer, the lacquer layer, and the cover film form a sandwich-like composite with outer substrate films.

The term "directly" means that no further material, for example an adhesive, is present between the lacquer layer and the cover layer. Only voids-forming microfluidic structures may be present between the structured layer and the bonding lacquer layer.

Step (g):

In the component according to the invention, the structured layer and the bonding lacquer layer are fully cured, i.e. polymerized and crosslinked. This complete curing takes place in step (g). The curing is preferably a photopolymerization and is carried out by exposure to a radiation. This radiation is preferably light of suitable wavelength, for example UV light. The dose of radiation is such as to ensure complete polymerization of the starting material. Preferably, an overdose is used to ensure the completeness of the curing.

In the present invention, the partial curing in step (c) and the curing in step (g) may be performed in the same or different ways, with the same way being preferred. The partial curing and the hardening may be carried out independently of each other thermally or by using UV rays or electron beams. Preferably, the partial curing in step (c) and the curing in step (g) are performed by UV irradiation.

What is claimed is:

1. A method of manufacturing a component having a microfluidic structure, which is carried out in a continuous manner and comprises the following steps:
   (a) applying a layer of a curable embossing lacquer to a bottom film,
   (b) embossing recesses in the embossing lacquer layer obtained in step (a) using an embossing tool,
   (c) partially curing the embossed lacquer layer embossed in step (b) to form a partially cured structured layer,
   (d) removing the embossing tool to form a bottom member comprising the bottom film and the partially cured structured layer,
   (e) applying a layer of a curable bonding lacquer to a cover film to form a cover member, the thickness of the bonding lacquer layer of the cover member being less than the embossing depth of the partially cured structured layer of the bottom member formed in step (d),
   (f) forming a composite of the bottom member obtained in step (d) and the cover member obtained in step (e), wherein the partially cured structured layer of the bottom member is placed on the bonding lacquer layer of the cover member so that the recesses of the partially cured structured layer of the bottom member are sealed by the bonding lacquer layer of the cover member to form cavities which form a microfluidic structure, and
   (g) curing the partially cured structured layer and the bonding lacquer layer of the composite obtained in step (f) to form covalent bonds between these layers, wherein the curable bonding lacquer is not partially cured before step (g), thereby obtaining the component having a microfluidic structure.

2. The method of claim 1, wherein the curing in step (g) is carried out via the polymerization systems contained in the partially cured structured layer and the bonding lacquer layer, each containing polymerizable compounds having carbon-carbon double bonds.

3. The method according to claim 1, wherein the curable embossing lacquer and the curable bonding lacquer independently of each other comprise at least 50 mass % of a polymerization system selected from polymerizable compounds having carbon-carbon double bonds and thiol-ene systems.

4. The method according to claim 1, wherein the curable embossing lacquer and the curable bonding lacquer are at least 80 mass % of the same composition.

5. The method according to claim 1, wherein the cover member is arranged such that the curable bonding lacquer rests on the cover film by the action of gravity, or wherein the layer of curable bonding lacquer is selected to adhere to the cover member without covalent bonding.

6. The method according to claim 1, wherein the partial curing in step (c) and the curing in step (g) are carried out by means of UV irradiation.

7. The method of claim 1, wherein the bottom film and the cover film are each a polymeric film.

8. The method according to claim 1, wherein, after step (g), the cured structured layer and the cured bonding lacquer layer have the same thickness or a thickness which differs by at most 20% in the region of the cavities.

9. The method of claim 1, which is carried out in a continuous manner, wherein the bottom film and the cover film are each a polymer film, the curable embossing lacquer and the curable bonding lacquer are at least 80 mass % of the same composition, the curable bonding lacquer is not partially cured before step (g), the partial curing in step (c) and the curing in step (g) are carried out by UV irradiation, and the thickness of the bonding lacquer layer of the cover member is less than 20% of the depth of the recesses of the partially cured structured layer of the bottom member.

10. The method according to claim 1, wherein the curable embossing lacquer and the curable bonding lacquer each contain at least 50 mass % of polymerizable compounds having carbon-carbon double bonds, the curing in step (g) is carried out via polymerizable compounds having carbon-carbon double bonds in the partially cured structured layer and the bonding lacquer layer, and the curable embossing lacquer and the curable bonding lacquer are at least 80 mass % of the same composition.

11. A component having a microfluidic structure obtainable by a method according to claim 1, wherein the thickness of the bonding lacquer layer is less than 1 µm and the thickness of the structured layer is at least 5 µm, and wherein the thickness of the bonding lacquer layer of the cover member is less than 20% of the depth of the recessions of the partially cured structured layer of the bottom member.

12. The component having a microfluidic structure according to claim 11, wherein the polymer of the structured layer and the polymer of the bonding lacquer layer are at least 80 mass % identical.

13. The use of the component having a microfluidic structure according to claim 11 as a biosensor, in the diagnosis of germs, in environmental analysis or in the analysis of chemicals in process engineering.

* * * * *